F. I. JOHNSON.
VEHICLE TIRE.
APPLICATION FILED JULY 22, 1915.
1,287,034.
Patented Dec. 10, 1918.
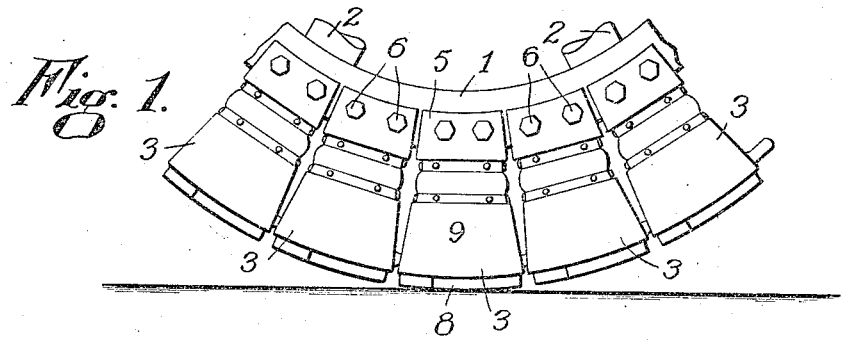
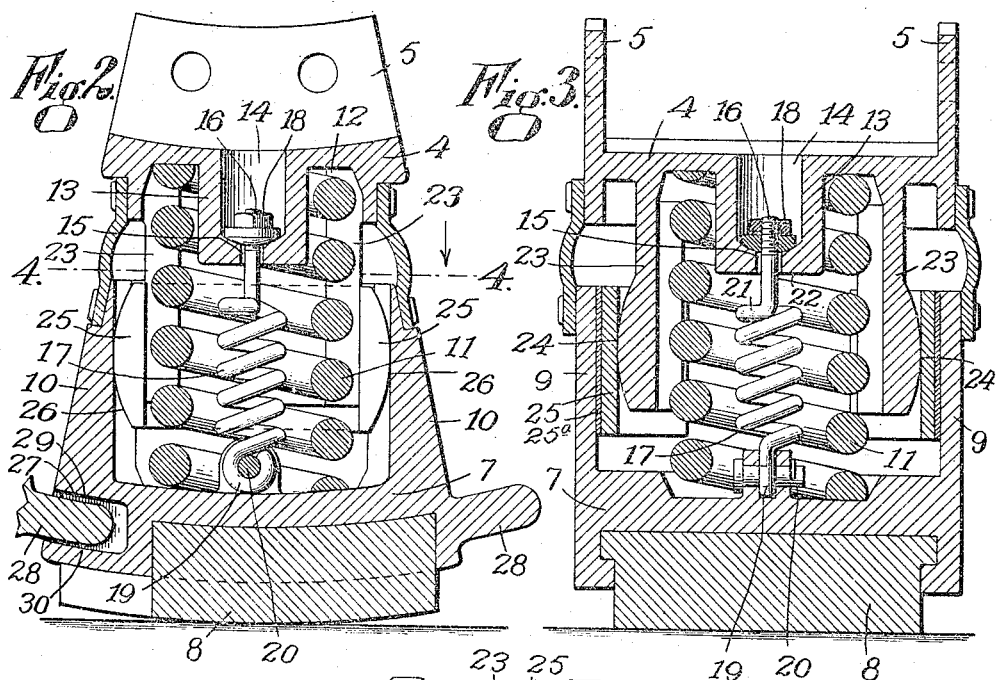
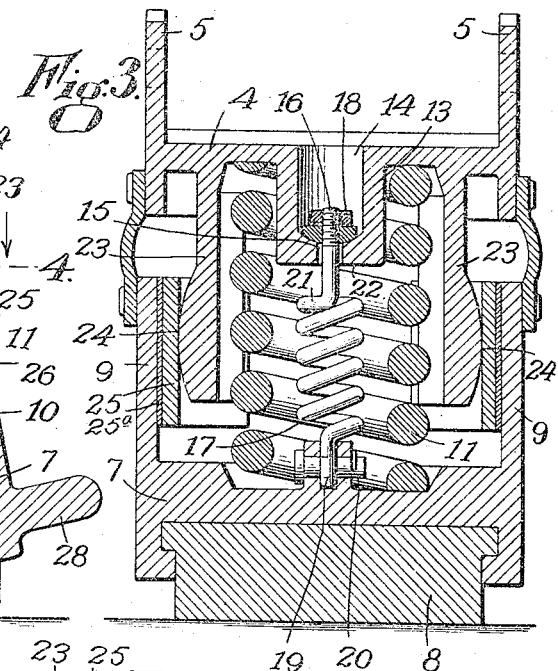
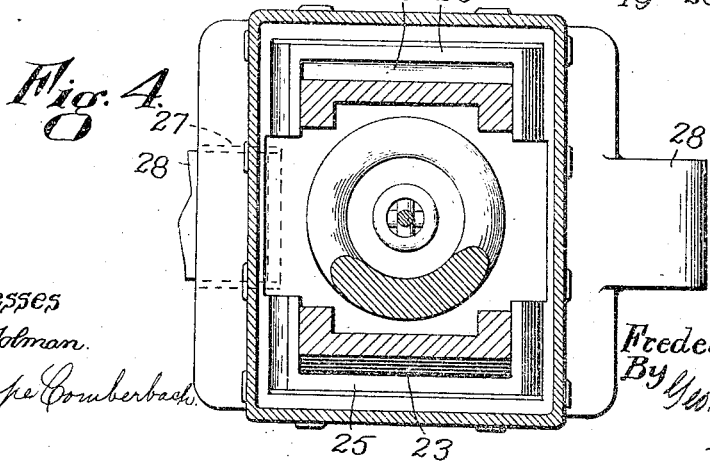
Witnesses
R. D. Tolman
Penelope Cumberbach
Inventor
Frederic I. Johnson
By Geo. H. Kennedy
Attorney

UNITED STATES PATENT OFFICE.

FREDERIC I. JOHNSON, OF FITCHBURG, MASSACHUSETTS, ASSIGNOR TO JOHNSON PNEU-METAL TIRE COMPANY, OF FITCHBURG, MASSACHUSETTS, A CORPORATION OF MASSACHUSETTS.

VEHICLE-TIRE.

1,287,034.     Specification of Letters Patent.     Patented Dec. 10, 1918.

Application filed July 22, 1915. Serial No. 41,370.

*To all whom it may concern:*

Be it known that I, FREDERIC I. JOHNSON, a citizen of the United States, residing at Fitchburg, in the county of Worcester and Commonwealth of Massachusetts, have invented a new and useful Improvement in Vehicle-Tires, of which the following, together with the accompanying drawings, is a specification.

My invention relates to that class of vehicle tires which comprise a series of resilient sections attached to the wheel rim, each of said sections having a tread plate held in its normal or extended position by the tension of one or more spiral springs.

The objects of my present invention are to provide a simplified form of construction with improved means for imparting the rotative movement of the wheel rim to the tread plates of the sections as they are successively brought beneath the wheel in position to support the load. These objects, among others, I attain by the construction and arrangement of parts as hereinafter described, the novel features being pointed out in the appended claims.

Referring to the accompanying drawings, Figure 1 represents a portion of a wheel rim having five resilient sections of a tire embodying my present invention attached thereto.

Fig. 2 is a central sectional view on a larger scale of one of the resilient sections composing my improved tire, the section being shown on the plane of rotation of the wheel.

Fig. 3 is a central vertical section of the same, the section being shown on a plane at right angles to the section shown in Fig. 2, or parallel with the axis of the wheel.

Fig. 4 is a transverse sectional view on the plane of the broken line 4—4, Fig. 2.

Similar reference characters refer to similar parts in the different figures.

Referring to Fig. 1, 1 denotes a portion of the wheel rim, said rim being supported upon the outer ends of radial spokes 2, 2, in the usual manner. Attached to the periphery of the wheel rim 1 are a series of resilient tire sections 3, which are duplicates of each other, their construction being represented in detail in the sectional views shown in Figs. 2, 3 and 4. Each of the sections 3 comprises a rim plate 4 having a pair of flanges 5 which inclose the sides of the wheel rim 1 and are attached thereto by bolts 6.

Mounted upon the periphery of the rim plate is a tread plate 7 recessed upon its outer surface for the reception of a non-metallic block 8. The tread plate 7 is provided with sides 9, 9, parallel with the flanges 5. The tread plate 7 is also provided with ends 10, 10, opposite the next adjacent tire sections. The sides 9 and ends 10 form the walls of a chamber in which a coiled spring 11 is inserted. One end of the spring 11 bears against the inner surface of the tread plate 7 and the opposite end enters an annular recess 12 in the rim plate 4, the elasticity of the coiled spring 11 serving to give resilience to the tire section by resisting the weight of the load. Concentric with the annular recess 12 is a boss 13 provided with a recess 14 and having a central hole 15 to receive the screwthreaded end 16 of a coiled spring 17. The screwthreaded end 16 carries a nut 18 and the opposite end of the spring is provided with a hooked end 19 which engages a pin 20 held in the tread plate. By means of the nut 18 the length of the coiled spring 17 is adjusted to cause the tension of the spring to hold the ends of the spring 11 in close contact with the tread plate 7 and the rim plate 4. When the spring 11 is at its normal length the spring 17 acts as a pull spring to draw the rim plate 4 and tread plate 7 toward each other. When the weight of the load presses the spring 11, the end 16 of the spring 17 slides through the hole 15 in the boss 13 until the coil 21 of the spring strikes the end 22 of the boss 13. During any further compression of the spring 11 the spring 17 will then act as a compression spring and its elasticity will become applied, like that of the spring 11, to resist the approach of the tread plate toward the rim plate.

The rotative movement of the wheel is imparted to the tread plate by means of two arms 23, 23, which extend radially outward from the rim plate. Between the arms 23 and the sides 9 are interposed plates 25 which bear against the convex surfaces 24 of the arms 23. The plates 25 extend around the edges of the arms 23, and the extensions are provided with convex surfaces 26 which are held in concave recesses in the ends 10 which serve to hold the plates 25 in place.

As the wheel rotates, the ends 10 successively produce a slight movement between the plates 25 and the sides 9. In order to reduce the friction between the sides 9 and the plates 25, I insert bronze plates 25ª, Fig. 3, and the friction between the plates 25 and the arms 23 as the rim plates are raised bodily is reduced by forming convex surfaces 24 on the arms 23.

One side of the tread plate is provided with a recess 27 and the opposite side is provided with a projecting tongue 28. When the sections are attached to the rim of the wheel the tongues 28 are inclosed in the recesses 27 of the next adjacent tire section. The recesses 27 are larger than the tongues 28 to provide for a slight independent movement of each tire section which is, however, kept within definite limits by the interlocking of adjacent sections. Both the tongue 28 and the recess 27 are flattened, as shown in Fig. 2, in order that any slight sidewise tipping or twisting movement of a tread plate may be communicated to the adjacent connected tread plate. If the tire section carrying the tongue is compressed faster than the tire section interlocked therewith, the tongue will strike the inner wall 29 of the recess. If, on the other hand, the tire section having a recess is compressed faster than the interlocked tire section having the tongue, the tongue will contact against the outer wall 30 of the recess, but in either case the radial movement of one tire section will be communicated to the adjacent tire section. In like manner any sidewise deflection of a tire section will be communicated to its adjacent interlocked tire section.

Each tire section contains a single compression spring 11 which is disposed concentrically to the tire section. The expansive force of the spring 11 will be applied between the centers of the rim plate and the tread plate, thereby securing greater flexibility to the tire section than in sections where a multiplicity of compression springs are employed upon opposite sides of the centers of the rim and tread plates.

The coiled spring 17 serves, when the compression spring 11 is fully expanded, to hold the tread plate in position with one end of the spring 11 in contact with the tread plate and its opposite end in contact with the rim plate. The nut 18 is screwed upon the end of the spring 17, until a strain is placed upon the spring, causing a pressure to be applied to the ends of the spring 11. As the spring 11 becomes compressed by the weight of the load, the screw threaded end of spring 17 is pushed into the hole 15 and in case the load is heavy enough the end of the boss 13 will strike the end coil 21 of the spring 17, compressing the spring 17, whose resistance will be added to that of the spring 11. The spring 17, therefore, will perform the double function of holding the tread plate the proper distance from the rim plate before the load is applied, and also of resisting the movement of the tread plate toward the rim plate under the stress of a heavy load.

I claim,

1. In a vehicle tire, a resilient tire section, comprising a tread plate, a rim plate, a compression spring interposed between said rim plate and said tread plate, a tension spring having one end connected with the tread plate and its opposite end connected with the rim plate and capable of sliding therein, and having an end coil arranged to contact with the rim plate as said compression spring is compressed.

2. In a vehicle tire, a resilient tire section, comprising a tread plate, a rim plate, a compression spring interposed between said rim plate and said tread plate, an expansion spring connected at one end with said tread plate and having its opposite end concentric with the spring and screwthreaded, and a nut carried by said screwthreaded end and held in a recessed boss on the rim plate, whereby the tension of said expansion spring may be varied.

3. In a vehicle tire, a resilient tire section, comprising a rim plate having radially projecting arms, a tread plate having sides and ends inclosing said arms, and plates interposed between said arms and said sides and provided with convex surfaces held in concave recesses in said ends.

4. In a vehicle tire, a rim plate, a tread plate, arms projecting radially from said rim plate, sides and ends projecting from said tread plate and inclosing said arms, plates between said sides and said arms, and anti-friction plates between said first mentioned plates and said sides.

5. In a vehicle tire, a rim plate, arms projecting radially from said rim plate and in the plane of rotation of the wheel, said arms having convex outer surfaces, a tread plate, and plates interposed between said convex surfaces and sides projecting from said tread plate.

FREDERIC I. JOHNSON.

Witnesses:
PENELOPE COMBERBACH,
NELLIE WHALEN.